US006349288B1

(12) United States Patent
Barber

(10) Patent No.: US 6,349,288 B1
(45) Date of Patent: *Feb. 19, 2002

(54) ARCHITECTURE FOR ACCESS OVER A NETWORK TO PAY-PER-VIEW INFORMATION

(76) Inventor: Timothy P. Barber, 11931 Chalon La., San Diego, CA (US) 92128

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/972,639

(22) Filed: Nov. 18, 1997

(51) Int. Cl.[7] .............................................. G06F 17/60
(52) U.S. Cl. ....................................................... 705/26
(58) Field of Search ............................... 705/14, 1, 26; 395/200; 380/24; 709/217

(56) References Cited

U.S. PATENT DOCUMENTS

| | | | | |
|---|---|---|---|---|
| 4,512,453 A | * | 4/1985 | Schuller et al. | |
| 4,750,119 A | * | 6/1988 | Cohen et al. | 705/14 |
| 5,023,782 A | * | 6/1991 | Lutz | 380/23 |
| 5,131,039 A | * | 7/1992 | Chaum | 380/24 |
| 5,200,889 A | * | 4/1993 | Mori | 705/14 |
| 5,276,736 A | * | 1/1994 | Chaum | 380/23 |
| 5,537,314 A | * | 7/1996 | Kanter | 705/14 |
| 5,640,505 A | * | 6/1997 | Hearn et al. | 395/182.02 |
| 5,666,416 A | | 9/1997 | Micali | 380/23 |
| 5,677,955 A | | 10/1997 | Doggett et al. | 380/24 |
| 5,715,314 A | * | 2/1998 | Payne et al. | 380/24 |
| 5,715,403 A | * | 2/1998 | Stefik | 705/44 |
| 5,761,308 A | * | 6/1998 | Torii et al. | 380/24 |
| 5,819,226 A | * | 10/1998 | Gopinathan et al. | |
| 5,930,777 A | * | 7/1999 | Barber | |

FOREIGN PATENT DOCUMENTS

GB   0 333 338 A2 *   9/1989   ............ G07F/17/32

OTHER PUBLICATIONS

"A Joint Effort to Curb Refund Policy Abuse . . . ", Chain Store Age Executive Edition, pp. 57–58, May 1982.*
"Retailer Streamlines Credit Authorization", Communication News, pp. 22, Aug. 1990.*
D. Wilensky, "Growth of Red Tape Outpacing Expansion of Workforce", Discount Store News, pp. 93, May 1994.*
"Computer Dictionary", Microsoft Press, second edition, 1994, p. 25, QA 76.15.M54, 1993, c. 136.*
"Connecticut Revenue Service Department: Internet Advertising Charges Not Subject To Tax", Tax Topics, vol. 4, No. 1, Mar. 1, 1996.*
"America Online Takes Additional Measures to Step Up Service and Ensure Customer Satisfaction", PR Newswire, Jan. 29, 1997.*
Nelson, Jeffry: "New Law Regulates Online Trade", Arizona Business Gazette, vol. 117 No. 4 p. 1, Jan. 23, 1997.*

* cited by examiner

Primary Examiner—Vincent Millin
Assistant Examiner—Charles R. Kyle
(74) Attorney, Agent, or Firm—Ware, Fressola, Van Der Sluys & Adolphson, LLP

(57) ABSTRACT

A highly distributed architecture for implementing payments for access to pay-per-view information offered on a network, especially the Internet. The architecture includes elements that not only collect payment for access to the pay-per-view information but also make possible a refund of the payment in case a consumer requests and is granted a refund. The architecture allows for monitoring the conduct of consumers and information vendors to detect behavior that might be unscrupulous. The architecture also includes elements that provide for compensating an advertiser for advertising pay-per-view information provided by an information vendor and for recovering the compensation in the case of a refund. The architecture scales to meet consumer demand by allowing for many of the kind of element in the architecture responsible for the more computationally intensive work of arranging for access to the information, and of charging for the information.

8 Claims, 1 Drawing Sheet

ARCHITECTURE FOR ACCESS OVER A NETWORK TO PAY-PER-VIEW INFORMATION

BACKGROUND OF THE INVENTION

The present invention is an architecture for servers implementing a system providing access over a network to pay-per-view information. More particularly, the present invention is a highly distributed architecture allowing refundable purchases of access to pay-per-view information over a network.

Co-owned U.S. Pat. No. 5,930,777, entitled "Method of Charging for Pay-Per-Access Information Over a Network," issued Jul. 7, 1999; and U.S. patent application Ser. No. 08/893,503, entitled "Bandwidth-Preserving Method of Charging for Pay-Per-Access Information on a Network," filed Jul. 11, 1997, disclose different protocols for providing access over a network to pay-per-view information. These applications do not provide an architecture for a system implementing access, nor do these applications disclose or suggest a means of providing for a refund of a purchase of access when a consumer is dissatisfied. In addition, neither of these applications specifically addresses how to keep a consumer who has purchased information from providing the address of that information to others. The present invention provides an architecture for a system implementing purchases and refunds of access over a network, such as the Internet, of pay-per-view information, and does so in a way that allows for scaling, i.e. natural growth in the system in response to growth and demand.

Some Terminology in Connection with Use on the Internet

To describe the present invention in the context of the Internet, this specification uses some standard Internet terminology associated with Web documents and transport protocols. Hypertext markup language (html) is a format used by most documents on the World Wide Web ($W^3$). A uniform resource locator (URL) is a Web address, which uniquely identifies the location of a particular document (information-bearing page) on the network. A hypertext transfer protocol (http) is the standard protocol used to retrieve and view Web documents. A common gateway interface (cgi) is a Web object that when referenced executes a program at a destination address, and returns some data or a program-generated html document. An extended URL (also called a cgi-extended URL) is a Web address that is said to be extended because of having data used as input by a cgi program at a destination address. An example of an extended URL is http://www.site.com?data=3991772391.

SUMMARY OF THE INVENTION

The present invention is a highly-distributed architecture of servers on a network for implementing a system of pay-per-view access over the network. These servers operate independently but cooperate to provide for both the payment for access to pay-per-view information as well as a refund when a customer is dissatisfied. The architecture is said to be distributed because different tasks performed by the system, such as collecting payment or offering a refund, reside on different servers, acting as independent agents.

The architecture includes four kinds of servers, each having a different role. All of the servers can be owned by a single entity, called here a broker. As will be explained below, a consumer interested in purchasing access to information provided by a vendor is directed to a price tag server, which further describes the information to the consumer and enables the consumer to purchase the information or decline the offer for sale. If the consumer decides to purchase the information, the consumer is directed to a receipt server which provides the consumer with the receipt for the purchase in a way that allows a refund. The receipt server then directs the consumer to the actual location of the pay-for-view information. After viewing the information, if the consumer wants a refund, the consumer uses the receipt to link to a refund serve, which has the consumer provide a reason for granting the refund. Then the refund server conveys this explanation to the information vendor, who, by communication through the refund server, grants or denies the refund.

The architecture of the present invention also provides for a prelude to the above scenario. In the prelude, a consumer observes an advertisement for an information vendor's pay-per-view information posted on the network by an advertiser different from the information vendor. The referral server redirects the consumer from the advertiser to the information vendor, providing this redirection in a way that allows the other elements of the architecture both to compensate the advertiser for the referral and to reclaim the compensation from the advertiser if the consumer is granted a refund.

In the case of an implementation on the Internet, the independent automated transaction processing elements of the distributed architecture can be generic http servers with cgi capability.

BRIEF DESCRIPTION OF THE DRAWINGS

The above and other features and advantages of the invention will become apparent from a consideration of the subsequent detailed description presented in connection with FIG. 1, which shows the distributed architecture of the present invention in terms of the distinct elements it comprises, and which also indicates the different interactions that occur between the different elements and a consumer, an information vendor, and an advertiser.

DESCRIPTION OF THE PREFERRED EMBODIMENT

Figure 1:
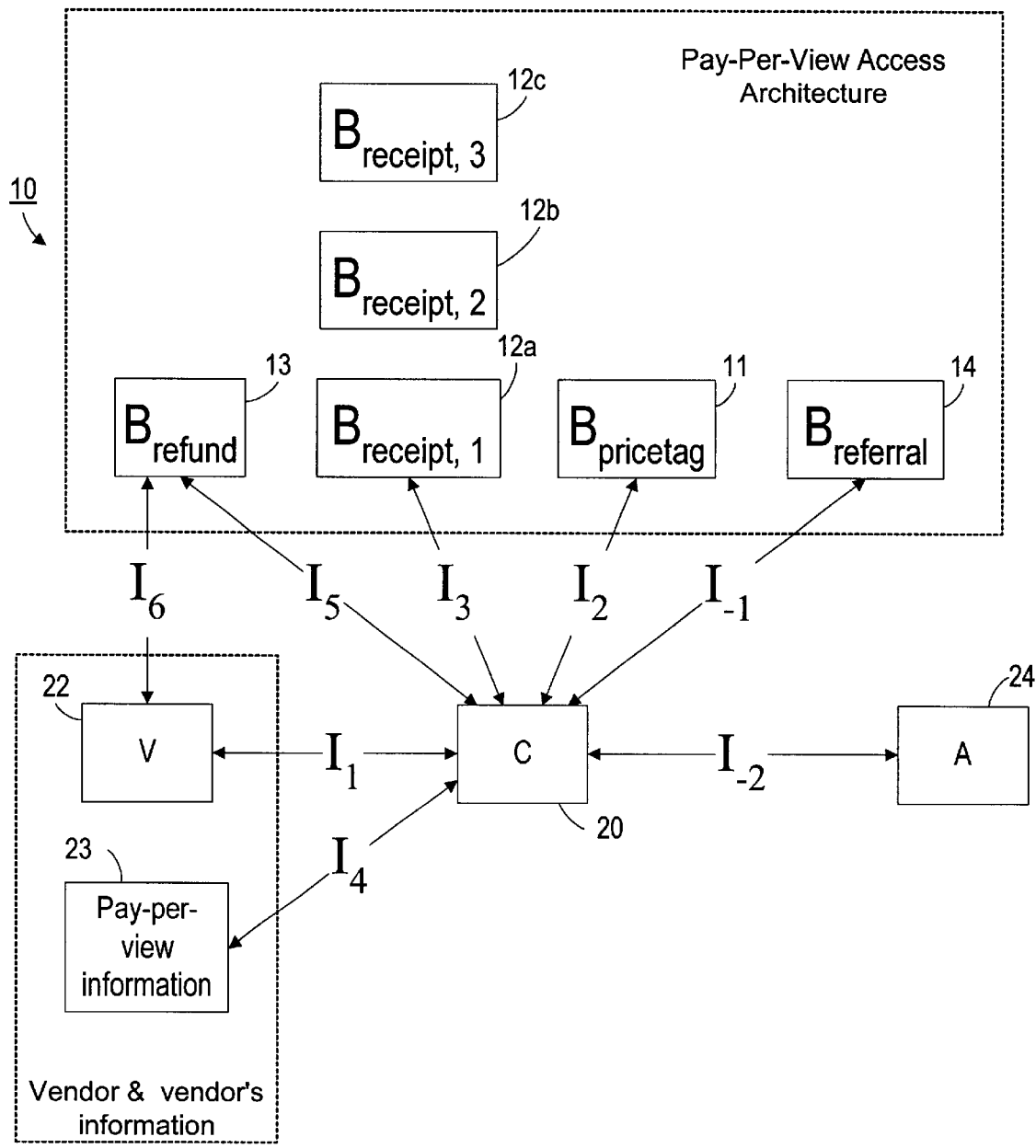

The information purchasing architecture of the present invention, in the preferred embodiment, will now be described by way of a scenario, i.e. a particular sequence of actions illustrating the operation of the invention in the preferred embodiment. In this scenario, as illustrated in FIG. 1, an advertiser 24 leads a consumer 20 to purchase access to information 23 provided by a vendor 22, and later requests and is granted a refund. The purchase and refund are provided using a system according to the architecture of the present invention 10, in which the various elements of the architecture are all owned or operated by a particular broker. In what follows it is assumed that the consumer, the vendor, and the advertiser, all have accounts with the broker. These accounts hold some form of scrip recognized by all parties as valid in exchange for access to information and also valid in exchange for ordinary money. In the preferred embodiment, the accounts hold scrip in denominations that are as small as one tenth of one hundredth of a US dollar, thereby allowing payments of quite small value, so-called micropayments.

Referring now to FIG. 1, the consumer 20 visits the advertiser 24 and observes an advertisement for some pay-per-view information 23 provided by the information vendor 22. After examining the advertisement, the consumer elects to find out more about the pay-per-view information and to possibly purchase access. The consumer makes this election by exercising a link provided by the advertiser. The link connects the consumer to the referral server 14, an agent of a broker and an element of the architecture 10 of the present invention.

On the Internet, a link at a first website is a $W_3$ address of another website embedded in a document at the first website. The link may include various cgi parameters, as described above, to pass information between servers on the network.

All of the interaction between the consumer 20 and the advertiser 24 is indicated by the interaction designated $I_{-2}$, the subscript made negative to indicate that this interaction is part of the prelude leading to the main scenario. After the consumer 20 is redirected to the referral server 14, in interaction $I_{-1}$, the referral server encodes as a special environment variable information about the advertiser, and then redirects the consumer to the information vendor 22.

Now the main part of the scenario begins. While linked to the information vendor 22, in interaction $I_1$ the consumer 20 receives from the vendor, in a single download, a description of the pay-per-view information offered by the vendor, and also a link that can be exercised to request purchasing information, including the price. The consumer examines the description included in $I_1$, and decides to retrieve the purchasing information by exercising the link to the purchasing information included in $I_1$. The link redirects the consumer to a price tag server 11 resulting in interaction $I_2$ between the consumer and the price tag server.

Interaction $I_2$ represents the consumer 20 linking to the price tag server 11 and retrieving from the server, in a single download, purchasing information about the pay-per-view information being considered by the consumer, including the cost of access and information about the vendor 22, and a link that can be exercised to purchase access to the described information. The consumer decides to purchase access to the information and exercises the purchase link; exercising the purchase link results in interaction $I_3$ between the consumer 20 and the receipt server 12a. The price tag server 11 dynamically selected the receipt server 12a from among several possible receipt servers 12a, 12b, 12c based on information the price tag server had recorded on how it had recently distributed load among the different receipt servers. The decision by the price tag server of which receipt server to use was encoded in the link provided to the consumer in interaction $I_2$.

In interaction $I_3$, the receipt server 12a issues the consumer 20 a receipt for the purchase of the pay-per-view information. The receipt includes a link to the actual location of the pay-per-view information 23, which the consumer accesses in interaction $I_4$, and also a link that the consumer can exercise to request a refund. The receipt also includes a portion that can be saved by the consumer as a record of the purchase, useful, for example, in recording expenses for tax purposes or for billing others for the service of accessing the information.

The access of interaction $I_4$ is intended to be temporary, and exclusively for the consumer 20 who has paid for the access, not others. The architecture of the present invention provides for this exclusive and time-limited access by employing a special access protocol enabled by the architecture of the present invention. According to this protocol, the price tag server 11 acts as an access authorization server for the document-server hosting the information 23 of the information vendor 22. The two machines agree in advance on a secret encryption key consisting of some number of random bytes.

The function of the authorization server is to direct qualified clients to the document server to retrieve files. With each request, the authorization server issues the client an access token that is a string of digits. This token is used by the client for gaining access to a document for a limited time.

In the preferred embodiment, the token includes the following fields:
file—the name of some specific file, service, or port on the document server;
time=seconds elapsed since Jan. 1, 1970 GMT, as computed by the authorization server;
span=some number of seconds, which will be used to determine how long access is granted; and
key=shared secret string of random bytes.
Then the token is constructed according to:

token=file|time|span|hash(file|time|span|key)

where | indicates concatenation of variables, and hash is any modern cryptographic hash function, such as SHA or MD5.

When the consumer presents a token to the document server, the document server first checks the token to make sure it has not expired. For example, defining $t_2$ as the number of seconds elapsed since Jan. 1, 1970 GMT as computed by the document server at the moment of the document request, access is denied if the time of access differs from $t_2$ by an amount more than span.

Next, the document server checks the token to make sure it is not counterfeit. Since file, time, and span are sent in the unencrypted, and key is known in advance, it is easy to compute the hash function and so check the authenticity of the token. If the token is not valid, then access is denied. If the token passes both tests, the document server transmits the document to the consumer using a network protocol. The consumer then has full access to the document until the token expires.

The receipt issued to the consumer 20 by the receipt server 12a includes a segment that provides a means by which the consumer can request a refund. After examining the pay-per-view information, the consumer decides to request a refund. To do this, the consumer executes the refund request segment of the receipt. This action links the consumer to the refund server 13.

In interaction $I_5$, the refund server 13 has the consumer explain why the consumer wants a refund. In interaction $I_6$, which proceeds by electronic mail, the refund server 13 provides this refund request, including the explanation, to the information vendor 22. Also in interaction 16, the information vendor grants or denies the refund request. Refund server 13 keeps track of both how often the particular consumer 20 has requested a refund, and how often the information vendor 22 has granted refunds.

The refund server 13 adjusts the accounts of both the information vendor 22 and the advertiser 24 to reflect that the information vendor has granted a refund. The refund server is able to adjust not only the information vendor account but also the advertiser account because the environment variable created by the referral server 14 has been made to track the sequence of interactions, being carried along by the price tag server 11 and receipt server 12a.

In another scenario, a consumer may not have an account with the same broker as the information vendor and advertiser. In that case, the consumer broker and information vendor broker cooperate to assure payment to the information vendor from the account of the consumer and to refund to the account of the consumer the purchase price if the consumer is granted a refund. Similar cooperation among different brokers occurs when the advertiser uses another broker.

The architecture of the present invention offers several advantages. First, there is a third party (the price tag server) summary of the details of a purchase provided to a consumer before the purchase is actually made. This reduces the risk of an unscrupulous information vendor preying on naive consumers. Second, a consumer can remain anonymous in dealing with an information vendor both in purchasing pay-per-view information and in requesting a refund.

Finally, this architecture allows for a non-arbitrary mechanism for deciding whether to grant a consumer a refund, and, advantageously, arranges for the information merchant to make the refund decision; certainly the broker is less likely to be equipped to make a knowledgeable decision about whether a refund is reasonable. In addition, the architecture allows providing some oversight of unscrupulous behavior by either consumers or information vendors. The refund server can monitor the pattern of refund-granting by an information vendor, and also can monitor the pattern of refund-requesting by a consumer.

It is to be understood that the above-described arrangements are only illustrative of the application of the principles of the present invention. Numerous modifications and alternative arrangements may be devised by those skilled in the art without departing from the spirit and scope of the present invention and appended claims are intended to cover such modifications and arrangements.

What is claimed is:

1. A system for implementing access over a computer network to pay-per-view (ppv) information on the network, the ppv information provided by a vendor and accessed by a consumer, the consumer having an account with a first broker holding resources for paying for access to the ppv information, and the vendor having an account with a second broker for receiving payment for access to the ppv information, the system comprising:

a price tag server, for providing to the consumer a description of the ppv information and also a means for executing a purchase of access to the ppv information, the means of executing the purchase including a link to a receipt server;

the receipt server, for providing to the consumer a receipt including a link to the ppv information and also a link to a refund server for requesting a refund; and the refund server, for providing the consumer with a means for explaining why a refund should be granted, for receiving the explanation from the consumer, for communicating the request to the vendor, for receiving from the vendor a decision on the request, and for communicating that decision to the consumer, and also for adjusting the vendor account if the vendor grants the refund;

wherein the price tag server, the receipt server, and the refund server are each operated by the second broker, who is other than the vendor, wherein at least the refund server accommodates more than one vendor, and further wherein the refund server monitors refund-granting by each vendor making use of the system.

2. A system as claimed in claim 1, further comprising a referral server responsive to the consumer exercising a link made available by an advertiser who is not the vendor and who has an account with a third broker, the link associated with an advertisement of the ppv information provided by the vendor, the link resulting in the consumer interacting with the referral server and the referral server providing, in a special environment variable, a description of the advertiser and the ppv information advertised sufficient for the receipt server to compensate the account of the advertiser if the consumer purchases access to the advertised ppv information, wherein the referral server is operated by either the first broker or the second broker, each of whom is other than the vendor.

3. A system as claimed in claim 1, further comprising other receipt servers, all addressable by the price tag server, and wherein the price tag server links a consumer to one or another of the receipt servers depending on what the price tag server has recorded about the availability of each receipt server, wherein the other receipt servers are operated by the second broker, who is other than the vendor.

4. A system as claimed in claim 1, wherein the system is implemented so that each server is a generic hypertext transfer protocol (http) server of the Internet and has common gateway interface (cgi) capability.

5. A system as claimed in claim 1, wherein the price tag server and a document server of the vendor hosting the ppv information share a secret key, and the price tag server issues to the consumer an access token including the key and including a hashing of a means of identifying the ppv information, the time of purchase, and the time span for which access is granted.

6. A system as claimed in claim 1, wherein the receipt provided by the receipt server also includes a portion that can be saved as a record of the purchase.

7. A method for implementing access over a computer network to pay-per-view (ppv) information on the network, the method involving a consumer, a vendor, at least one broker, and a third-party who is neither the consumer nor the vendor, the method comprising the steps of:

a) having a vendor make available over the computer network ppv information;

b) having a consumer obtain an account with a first broker and having the first broker hold resources for paying for access to the ppv information;

c) having the vendor obtain an account with a second broker for receiving payment for access to the ppv information;

d) having an automated price tag server operated by the third-party provide to the consumer a description of the ppv information and also a means for executing a purchase of access to the ppv information, the means of executing the purchase including a link to a receipt server operated by the third-party;

e) in response to the consumer electing to purchase the ppv information, having the receipt server provide to the consumer a receipt including a link to the ppv information and also a link to a refund server operated by the third-party for requesting a refund, wherein the refund-server is able to accommodate more than one vendor;

f) in response to the consumer electing to ask for a refund, having the refund server provide to the consumer a means for explaining why a refund should be granted, having the refund server receive the explanation from the consumer, having the refund server communicate the request to the vendor, having the refund server receive from the vendor a decision on the request, having the refund server communicate that decision to the consumer, and having the refund server adjust the vendor account if the vendor grants the refund; and g) in response to any request by the consumer for a refund in connection with the purchase of ppv information by any vendor provided according to steps a)–f), having the refund server monitor the refund-granting by the vendor who provided the ppv information.

8. A method as claimed in claim 7, further comprising the step of:

in response to the consumer exercising a link made available by an advertiser who is not the vendor and who has an account with a third broker, having the consumer connect to a third-party referral server, and having the third party referral server provide, in a special environment variable, a description of the advertiser and the ppv information advertised sufficient for the third-party receipt server to compensate the account of the advertiser if the consumer purchases access to the advertised ppv information, wherein the link is associated with an advertisement of the ppv information provided by the vendor.

* * * * *

UNITED STATES PATENT AND TRADEMARK OFFICE
CERTIFICATE OF CORRECTION

PATENT NO. : 6,349,288 B1
DATED : February 19, 2002
INVENTOR(S) : Timothy P. Barber It is certified that error appears in the above-identified patent and that said Letters Patent is hereby corrected as shown below:

Column 1,
Lines 14-17, "US Patent applications 08/893,503, entitled "Bandwidth-Preserving Method of Charging for Pay-Per-View Access Information on a Network," filed 'July 11, 1997' should be deleted and -- co-owned U.S. Patent 6,157,917, entitled "Bandwidth-Preserving Method of Charging for Pay-Per-View Access Information on a Network," issued December 5, 2000 -- should be inserted.
Lines 19, 20 and 23, "applications" should be -- patents --.
Line 30, "and" should be -- in --.

Column 2,
Line 12, "serve" should be -- server --.

Column 3,
Line 8, "$W_3$" should be -- $W^3$ --.

Column 4,
Line 46, "16" should be -- $I_6$ --.

Column 5,
Lines 54-57, "at least the refund server accommodates more than one vendor, and further wherein the refund server monitors refund-granting by each vendor making use of the system" should be deleted and -- the refund server monitors refund-granting by the vendor -- should be inserted.

UNITED STATES PATENT AND TRADEMARK OFFICE
CERTIFICATE OF CORRECTION

PATENT NO.   : 6,349,288 B1
DATED        : February 19, 2002
INVENTOR(S)  : Timothy P. Barber It is certified that error appears in the above-identified patent and that said Letters Patent is hereby corrected as shown below:

<u>Column 6,</u>
Lines 50-52, ", wherein the refund-server is able to accommodate more than one vendor" should be deleted.

Signed and Sealed this

Eleventh Day of March, 2003

JAMES E. ROGAN
*Director of the United States Patent and Trademark Office*